(12) United States Patent
Champion et al.

(10) Patent No.: US 8,273,674 B2
(45) Date of Patent: Sep. 25, 2012

(54) SELF-FLOW REFRACTORY MIXTURE

(75) Inventors: Thibault Champion, Chevel Blanc (FR); Christian Claude His, Cavaillon (FR); Franceline Marguerite Louise Villermaux, Avignon (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 311 days.

(21) Appl. No.: 12/158,693

(22) PCT Filed: Dec. 15, 2006

(86) PCT No.: PCT/FR2006/051364
§ 371 (c)(1),
(2), (4) Date: Nov. 24, 2008

(87) PCT Pub. No.: WO2007/074275
PCT Pub. Date: Jul. 5, 2007

(65) Prior Publication Data
US 2009/0091051 A1    Apr. 9, 2009

(30) Foreign Application Priority Data

Dec. 21, 2005   (FR) ..................................... 05 13031

(51) Int. Cl.
C04B 35/00    (2006.01)
C04B 7/32     (2006.01)
(52) U.S. Cl. ...................................... 501/127; 106/692
(58) Field of Classification Search ............. 501/94, 501/100, 102, 127, 128, 133, 124, 125; 264/30; 106/400, 401, 692
See application file for complete search history.

(56) References Cited

U.S. PATENT DOCUMENTS

| | | | | |
|---|---|---|---|---|
| 5,378,279 | A * | 1/1995 | Conroy .......................... | 106/719 |
| 5,512,523 | A * | 4/1996 | Ono et al. ...................... | 501/127 |
| 6,596,250 | B2 * | 7/2003 | Greenwood et al. ........... | 423/335 |
| 7,241,828 | B2 * | 7/2007 | Kyte et al. ...................... | 524/425 |

FOREIGN PATENT DOCUMENTS

| | | |
|---|---|---|
| EP | 0 609 868 A2 | 8/1994 |
| JP | 3-115176 | 5/1991 |
| JP | 6287075 A | 10/1994 |
| JP | 07-267745 A * | 10/1995 |
| JP | 07267745 A * | 10/1995 |
| JP | 11-92241 | 4/1999 |
| JP | 2005162569 A * | 6/2005 |

OTHER PUBLICATIONS

Notification of an opposition, French Patent No. 1968912 dated Jul. 13, 2010. English translation.
Japanese Office Action, dated Jan. 4, 2012, from corresponding Japanese application 2008-546546.

* cited by examiner

*Primary Examiner* — Emily Le
*Assistant Examiner* — Lynne Edmondson
(74) *Attorney, Agent, or Firm* — Young & Thompson

(57) ABSTRACT

A refractory self-flow filler mortar, includes in mass % with relation to the basic refractory material, at least 1% and at most 10% of non-granulated spherical particles with median size greater than 0.1 μm and less than or equal to 2 mm and further includes in mass % with relation to the total dry mass of the mortar, less than 4.5% of silica ($SiO_2$) and between 1% and 8% water, the standard deviation of the non-granulated spherical particle size being less than 100%.

14 Claims, No Drawings

SELF-FLOW REFRACTORY MIXTURE

The invention relates to a self-flow refractory mortar, particularly to make sintered refractory cements or concretes, as well as the use of this mortar to fill a hole less than 25 mm wide by self-flowing.

The refractory self-flow mortars, known as "self-flow" according to terminology defined by the ASTM C71 standard "Standard terminology relating to refractories", are wet mixtures which can be implemented without vibration nor input of external energy, without causing segregation.

Therefore these mortars are particularly useful in applications where a vibration or pressure is difficult, even impossible, for filling small confined spaces or crevices for example, with a width which is less than 25 mm, more often less than 10 mm. Indeed, vibrating or packing tools cannot access such spaces. To be able to substantially completely fill such interstices, the refractory self flow mortars, known as "filler mortars", typically have a flowability value greater than 280, preferably greater than 300.

The refractory self flow mortars are particularly useful in the field of the coating of petrochemical incinerators or reactors, for example to fill the interstices in between the refractory tiles and the metal shell of a reactor. In these applications, the refractory mortars notably ensure ultimate protection for the metal shell of the reactor in the case of accidental damage to the refractory coating, for example in the case that the covering refractory titles fall. Therefore, the metallic shell of the reactor is preserved until the refractory coating is repaired.

To make a refractory mortar self-flowable, it is known to add silica in the form of silica smoke or in colloidal state. The silica particles are thus classically substantially spherical, with a diameter between 0.3 and 0.5 μm. They act upon the flowability of the refractory mixture, not only because of their small size, but also their ability to chemically bond, by bonds of Van der Waals type, with water molecules. They therefore form a gel made from Si—O—H bonds which provides a stereochemical effect. Therefore the addition of water to the mixture makes it effectively fluidized.

For example, EP 0,609,868 describes mixtures comprising at least 4.95% of silica, 2 to 30% of spherical particles, with a median diameter of up to 30 μm. The flowability of these mixtures, measured according to the ASTM C1446-99 test, is greater than 180 mm if the mixtures comprise at least 6% of water, in mass % with relation to the dry material.

The presence of silica in a refractory mortar, whether it is in the form of silica smoke, in colloidal state, or incorporated into the mortar components, for example in the form of refractory argiles, damage however certain properties of the product obtained by sintering of the refractory self flow mixture. Particularly, it is known that the presence of silica is harmful to the creep resistance at temperatures greater than or equal to 1500° C. In certain operating conditions, the presence of silica also contributes to accelerating corrosion and wear, because of evaporation, notably in the form of SiO for example, in a chemically reducing environment, even comprising gaseous hydrogen.

Instead of silica, it is also known to add dispersants and a large quantity of water, typically greater than or equal to 20%, in mass in relation to the dry mass. The refractory self flow mixture must therefore be dried very slowly in order to avoid the appearance of cracks in the sintered product. Indeed, a cracking of the sintered product damages its mechanical strength and moreover, enables gas or liquid infiltrations. The implementation of these self-flow mortars thus induces increased costs.

Another technique to improve the flowability of dry mixtures is known in the field of fine-grained ceramics, i.e. with a size less than 200 μm. According to this technique, the grains are agglomerated in the form of substantially spherical aggregates, notably by classical granulation or atomization. Adding water in a granulated grains mixture is however considerably harmful for the flowability. Furthermore, adding water does not lead to setting, but to the disintegration of the agglomerates. Therefore, these granulated mixtures cannot be used to manufacture self-flow mortars.

From JP 11,092,241, one also knows refractory mortars which have an improved capacity to compaction during casting or when put under pressure. These mixtures comprise between 10 and 35% of spherical powders with a diameter between 0.1 and 2 mm and at least 9.8% of water, in mass % with relation to the basic refractory material comprising spherical particles and refractory oxide powders. Such additions of water are not acceptable for self-flow mortars as they lead to cracking when the temperature increases in the reactor. This cracking results from the confinement of the filler mortar, the free surface for water evaporation being weak in relation to the installed mass. They make the product particularly sensitive to a gas or liquid corrosion and cancel the protective function of the mortar. A refractory self-flow filler mortar must therefore have a ratio of the flowability value over the mass % of added water in relation to the mass of the basic refractory material of at least 35. The mixtures presented in JP 11,092,241 only present one ratio to the order of 14 to 19.

Furthermore, JP 11,092,241 indicates that an addition of spherical powders of lower than 10% leads to a consequent deterioration of the flowability and, particles with a diameter of less than 0.1 mm lead to detrimental segregation phenomena.

From JP 3-115,176, one also knows refractory mixtures comprising between 1 and 50% of spherical powders with a diameter between 0.001 and 0.1 mm, in mass % with relation to the basic refractory material. These mixtures are intended to be injected, the aim of JP 3-115,176 being to supply mixtures with a low resistance to the injection. The mixtures which can be injected, intended to be sprayed in a guniting installation, or "mixtures which can be sprayed", are distinguished from self-flow mortars by several characteristics.

Firstly, their function is not to fill in the interstices, but to cover free surfaces. The mixtures which can be sprayed must have a high mechanical strength, which explains the high amounts of phenolic resin or calcium aluminate-based cement (10 to 15% added, in mass in relation to the mineral mass of spherical particles and other oxide particles (or "aggregate")). Consequently, these mixtures have relatively high water additions, between 9.5 and 13% of added water in mass, in relation to the mass of spherical particles and other oxide particles. The flowability value/percentage of added water ratios are therefore in the order of 20 to 32, which is not sufficient for these mixtures to serve as filler mortars. The inventors were able to check that such additions of water in fact lead to cracking when the mortar is inserted in an interstice with a low free surface.

Furthermore, the injected mixtures classically have a CaO aluminate content of 15% in the mineral composition of the product. Such an amount is particularly unfavorable for the corrosion resistance.

In addition, the spheroidized particles, such as those presented in JP 3-115,176 or JP 11,092,241, have size distributions of a width which is generally greater than 100%, which is a restraint, as is specified in these applications, for the use, and conducts to increased water additions.

Therefore, there is a need for a refractory self-flow filler mortar, i.e. notably with a flowability value of at least 280 and a ratio of the flowability value over the mass percentage of added water in relation to the mass of the basic refractory material of at least 35, allowing the manufacturing of sintered products with a better resistance to corrosion than that obtained from known self-flow mortars containing silica.

According to the invention, this aim was reached by means of a refractory self-flow filler mortar comprising, in mass % with relation to the basic refractory material:
at least 1%, preferably at least 5%, preferably still at least 7%, and at most 10% of non-granulated spherical particles with median size greater than or equal to 0.1 µm and less than or equal to 2 mm, preferably less than or equal to 1 mm, preferably still less than or equal to 100 µm, preferably still less than or equal to 1 µm, and in mass % in relation to the total dry mass of the mortar (including the basic refractory material and the dry binders)
less than 4.5% of silica ($SiO_2$), preferably less than 2%, preferably still less than 1%, preferably still no silica, and
between 1% and 8% of water, preferably less than 5%, preferably still less than 4%, the relative standard deviation of the non-granulated spherical particle sizes, measured by the ratio between the standard deviation and the average of this distribution, being less than 100%, preferably less than 60%, preferably still less than 10%.

In a surprising way, the inventors discovered that the self-flow filler mortar according to the invention has a satisfactory flowability, without comprising silica, as we will see in a more detailed manner hereafter.

The limitation of the amount of silica advantageously provides a satisfying corrosion resistance. This limitation also enables the resistance to creep and cracking to be improved. According to the applications, this limitation can further improve other characteristics of the product obtained.

Preferably, the mortar according to the invention further comprises one or more of the following optional characteristics:

The spherical particles present a sphericity which is greater than or equal to 0.8, preferably greater than or equal to 0.9.

The amount of alumina is greater than 95% in mass % based on dry materials, and, preferably also based on the basic refractory mass. Advantageously, the sintered products obtained from such a mortar have a good creep resistance, i.e. a weak heat dimensional variation under pressure and at a fixed temperature.

The invention also concerns the use of a mortar according to the invention to fill in a hole with a width of less than 25 mm by self-flowing, preferably a hole of less than 10 mm and having a depth of less than 50 mm.

So-called "aggregates" mean the refractory particles except for additives which are added for a binding function before drying the mortar, which are not non-granulated spherical particles, i.e. particularly the non-spherical particles.

A particle is called "non-granulated" when it is not formed by an agglomeration of grains, notably by classic granulation or by atomization.

"Basic refractory material" or "basic refractory mass" means all non-oxide refractory components, such as silicon carbide or silicon nitride $Si_3N_4$, or/and refractory oxides, particularly $Al_2O_3$ or $ZrO_2$ based, except for additives which are added for a binder function before drying the mortar, such as temporary binders or hydraulic binders for example, such as those which are CaO aluminate based. The basic refractory materials are the major components, providing the properties of the cement obtained by sintering the mortar. This definition also excludes water, which is not a refractory material. The basic refractory material is therefore composed of aggregates and non-granulated spherical particles.

The "width" of a distribution or "relative standard deviation" is the ratio between the standard deviation and the average. This ratio is shown in percentages. Thus, a width of 100% corresponds to a standard deviation equal to the average.

The "size" of a particle is its greatest dimension measured on an image of this particle. The measure of the size of particles of a powder is done from the image of this powder poured onto a self-adhesive felt.

The particle is considered as "spherical" as soon as it presents sphericity, i.e. a ratio between its smallest diameter and its largest diameter greater than or equal to 0.75, however the sphericity was obtained.

A spherical particle is called "spheroidal" or "spheroidized" depending on whether its sphericity was obtained at the time of or after its solidification, for example by abrasion.

Preferably, the relative difference between the largest diameter and the smallest diameter of each spherical particle is less than 10%, preferably less than 5%. Beyond that, one considers that the sphericity defect, due to the presence of outgrowths or protrusions, affects the flowability of the mixture.

The type of spherical particles is not limited, provided that these particles are made from refractory products, particularly based on oxides of $ZrO_2$, $Al_2O_3$, even of carbide, particularly of SiC, or of nitride, particularly of $Si_3N_4$.

The spherical particles used can be slightly porous, i.e. have a density greater than 90% of the theoretical density, or full.

The mortar according to the invention also comprises "aggregates", namely powders of non-spherical refractory particles, or, for example from alumina, zirconia, zircon, silicon carbide or silicon nitride of a mixture thereof, even granulated spherical refractory particles.

Preferably, more than 99%, preferably substantially 100% in mass, of the basic refractory material is composed of silica, alumina, zirconia, silicon carbide or silicon nitride.

A refractory mortar according to the intention is manufactured by a mixture of water, possible additives and different powders, according to the target application.

This mixture can be made on site. But the mixture with water causes the beginning of a process which leads to the setting of the mortar and therefore implies a rapid use of the prepared mortar. Preferably, the powders and possibly one or more of the additives are thus prepared and stored in dry state. They can be mixed, preferably to homogenization, and packaged, for example in bags or "big bags", and delivered in dry state, preferably with an operation procedure.

According to the invention, the relative standard deviation of the distribution of sizes of non-granulated spherical particles, measured by the ratio between the standard deviation and the average of this distribution, is less than 100%, preferably less than 60%, preferably still less than 10%. In other words, all the spherical particles of the used powder have diameters which are close to one another. As we will see in more detail hereafter, the inventors therefore discovered that it is not enough to use a powder of non-granulated spherical particles in order to dispense with the need for the silica. Furthermore, the diameters of the spherical particles must not vary in great proportions.

The standard deviation and the average of the distribution of the sizes can be evaluated by analyzing a population of at least 100 particles, preferably 200. The samples are placed on a self-adhesive felt, then observed with an optical microscope or with a scanning electronic microscope depending on the size of the particles. The images acquired are then analyzed using the Analysis® software supplied by the Soft Imaging System Company, in order to measure the size of each particle of the powder and to derive its distribution.

The maximum size of mixed powders particles is preferably 5 mm, preferably 2.5 mm.

Other than water, the powders of non-spherical refractory particles and the non-granulated spherical particles, the refractory mixture according to the invention can also comprise one or more classically used shaping or sintering additives. As examples of additives which can be used, the following can be mentioned in a non-limited way:

temporary organic binders (i.e. completely or partly eliminated during sintering), such as resins, cellulose or lignone derivatives, such as carboxymethylcellulose, dextrin, polyvinyl alcohols, etc. Preferably, the amount of the temporary binder is between 0.1 and 6% in mass with relation to the dry mass of the mixture.

chemical setting agents, such as phosphoric acid, aluminum monophosphate, etc;

hydraulic setting agents, such as aluminous cements, of CaO aluminate type such as SECAR 71 or CA270 cements.

deflocculating or dispersing agents, such as alkali metal polyphosphates or methacrylate derivatives. All the known dispersants are conceivable, pure ionic, (for example HMPNa), pure steric, for example of sodium polymethacrylate type or combined.

Sintering promoters such as titanium dioxide (in a proportion which does not exceed approximately 2%, with relation to the dry mass of the mixture) or magnesium hydroxide;

shaping agents such as magnesium and calcium stearates;

argillaceous-type additions, which will facilitate the implementation and help sintering. These additions bring the silica and therefore, preferably, are limited to less than 2% in mass. Beyond that, they induce an excessive demand for water.

The additives can be added in the powders mixture if this one is prepared before humidification, or be introduced in the mortar with the water.

Preferably, the mortar comprises at least 1% and at most 8% of water, preferably less than 5%, preferably still less than 4%, in mass of water with relation to the dry mass, taking into account the presence of additives. Classically, the addition of water is determined according to the amount of the binder in the mixture, depending on the desired consistence or viscosity.

The wet mixture, or "mortar", can therefore be casted, for example on the interior wall of a reactor, then, depending on the operating conditions, be sintered or made ceramic in situ during the preheating of the reactor, in order to make a refractory coating or repair a damaged part of such a coating.

The mortar according to the invention is particularly well adapted to filling interstices of less than 25 mm, and even of less than 10 mm by simple casting. It can also be used for the manufacture of sintered blocks. To this end, one can implement a manufacturing method comprising the following successive steps consisting of:

a) casting a refractory mortar according to the invention into a mould in order to form a preform, b) removing the preform from the mould, c) drying said preform, d) baking said preform, preferably in an oxidizing atmosphere, preferably still at a temperature between 1,300 and 1,800° C., in order to form a sintered refractory block.

The following non-limitative tests are given in order to illustrate the invention.

The tested refractory self-flow mortars have been manufactured as described previously, according to the compositions in tables 1 to 3 below.

The following powders of non-granulated spherical particles were used:

spheroidal aluminate particle powder Admatech 0502, supplied by the Admatech Company, average diameter $D50=0.7$ μm spheroidal zirconia ($ZrO_2$) powder particles, supplied by the Netsch Company, median diameter $D50=1$ mm spheroidal zircon ($ZrSiO_4$) powder particles B505NP, supplied by the Saint-Gobain Zirpro Company, median diameter $D50=20$ μm The relative standard deviation of the sizes of particles of these powders is less than 100%.

The dispersants have been added in the form of powders.

The flowability has been measured according to the ASTM C1446-99 standard by means of a hollow truncated cone with bases of 70 and 100 mm and a height of 80 mm. The tested mortar is poured into the cone by the small base of the cone, the cone resting on a table horizontally, on its large base. After one minute waiting time to compensate for thixotropy phenomena, the cone is lifted in such a way that the mortar spreads out on the table naturally, without vibration or other input of external energy. The diameters of the spread out mortar, in two perpendicular directions, are measured five minutes after spreading. The "flowability value" is the average of these two values, in mm. The flowability is as great as this value is high.

A mortar is considered as not flowable when the flowability value is less than or equal to 100 mm. A flowability value between 100 and 180 corresponds to a weak flowability. Beyond this, between 180 and 280, the flowability is quite good but not sufficient for a filler mortar. Beyond 280, and particularly beyond 300, the flowability is considered as satisfactory for a filler mortar.

2 kg of the refractory powders mixture has been mixed in a Perrier-type kneader for five minutes, after adding water. The mortar thus prepared has been poured into cylindrical moulds of 50 mm in height and 50 mm in diameter. It was removed from the mould after 24 hours of drying in free air, then 24 hours at 110° C.

The bulk density (MVA) and the open porosity (PO%) were measured on the preforms thus obtained.

The porosity was measured according to the ISO 5017 standard. A porosity lower than 20% is considered as satisfactory for a refractory application.

To measure the creep resistance, the tested mortars have been poured into moulds having 150×25×25 mm dimensions (length*width*depth), and then baked at 1,650° C. for five hours in air.

The chemical composition of the mortars was classically calculated according to the components implemented. It corresponds to the composition, based on the mineral material, of the mortar obtained after drying and calcination at 750° C. in air, for around half an hour, i.e. treated so as to notably remove the temporary binders and the water added or contained in the hydrates.

The following tables summarize the characteristics of the tested samples and the results from tests.

TABLE 1

| basic mixtures of the products (formulation in mass %) | A | B | C | D |
|---|---|---|---|---|
| Electrocast white Corundum grains (6-12 mesh) (Pechiney ElectroMetallurgy) | 46 | 46 | 48.9 | 48.9 |
| Electrocast white Corundum grains (18F supplied by Treibacher) | 26 | 26 | 27.75 | 27.77 |
| Electrocast white Corundum powder (D50 < 200 μm) (WDCF-type from Treibacher) | 12 | 12 | 12.7 | 12.7 |
| silica smoke 983 U supplied by Elkem | 5.95 | 5.95 | 0 | 0 |
| CaO aluminate-based cement CA270 supplied by Alcoa | 5 | 5 | 5.3 | 5.3 |
| Bayer-type alumina powder supplied by Almatis Mediane diameter D50 # 4.3 microns | 5 | | | |
| Previous calcinated fine alumina powder but spheroidized according to a method defined in the Asahi patent EP 0,609,868 B1 | | 5 | 5.3 | 5.3 |
| Dispersant without phosphate: sodium methacrylate-type | | | | 0.03 |
| HMPNa dispersant powder supplied by Rhodia | 0.05 | 0.05 | 0.05 | |
| Sum of dry materials | 100 | 100 | 100 | 100 |
| Water | +4.2 | +4.2 | +4.2 | +7 |
| Relative standard deviation of the sizes of added spherical or spheroidized particles (in %) | NA | 230 | 230 | 230 |
| Cone according to EP 0,609,868 B1 (mm) | 120 | 220 | NT | NT |
| Cone mm found by the inventors (mm) | 117 | 160 | NF | NF |
| Flowability/% added water ratio ** | 28 | 38 | <25 | <25 |
| Chemistry calculated in % of the composition * | | | | |
| % SiO$_2$ | 5.8 | 5.8 | <0.6 | <0.6 |
| % Al$_2$O$_3$ | 92 | 92 | >97.5 | >97.5 |
| % ZrO$_2$ | NA | NA | NA | NA |
| % SiC | NA | NA | NA | NA |

NA = non-applicable; NT = non-tested; NF = non-flowable = value = 100 mm;
* containing the basic refractory material and the CaO aluminate-based cement;
** in relation to the basic refractory mass

TABLE 2

| basic mixtures of the products (formulation in mass %) | 1 Alumina Silica | 2 Alumina Alumina | 3 Alumina Alumina | 4 Alumina Zirconia |
|---|---|---|---|---|
| Sintered alumina (tabular) T60 8-14 mesh Alcoa | 30 | 30 | 23 | 24 |
| Sintered alumina (tabular) T60-14 mesh Alcoa | 21 | 21 | 21 | 22 |
| Sintered alumina (tabular) T60-325 mesh Alcoa | 25.97 | 25.97 | 25.97 | 27.97 |
| 983 U Silica smoke supplied by Elkem | 7 | 0 | 0 | 0 |
| CaO aluminate-based cement CA270 supplied by Alcoa | 4 | 4 | 4 | 4 |
| Bayer-type alumina powder supplied by Almatis Median diameter D50 # 4.3 microns | 12 | 12 | 19 | 12 |
| Spheroidal alumina Admatech 0502 by Admatech Median diameter D50 = 0.7 μm | | 7 | | |
| Spheroidal alumina supplied by Netsch Median diameter D50 = 1 mm | | | 7 | |
| Zircon (ZrO$_2$) spheroidal particles Netsch Median diameter D50 = 1 mm | | | | 10 |
| Dispersant without phosphate: sodium methacrylate-type | 0.03 | 0.03 | 0.03 | 0.03 |
| Sum of dry materials | 100 | 100 | 100 | 100 |
| Water | 7.5 | 7.5 | 7.5 | 7.5 |
| Relative standard deviation of the sizes of added spherical or spheroidized particles (in %) | NA | 52 | 6 | 7 |
| Flowability cone | 355 | 370 | 340 | 340 |
| Flowability/% added water ratio ** | 46 | 47 | 44 | 44 |
| MVA (bulk density) | 2.98 | 3.01 | 3.03 | |
| PO (open porosity) % | 16.3 | 18 | 19.4 | |

TABLE 2-continued

| basic mixtures of the products (formulation in mass %) | 1 Alumina Silica | 2 Alumina Alumina | 3 Alumina Alumina | 4 Alumina Zirconia |
|---|---|---|---|---|
| Chemistry calculated in % of the composition * | | | | |
| % $SiO_2$ | 6.8 | <0.6 | <0.6 | <0.6 |
| % $Al_2O_3$ | 92.5 | 98.5 | >98 | 89 |
| % $ZrO_2$ | NA | NA | NA | 10 |
| % SiC | NA | NA | NA | NA |

NA = non-applicable; NT = non-tested; NF = non-flowable = value = 100 mm;

\* containing the basic refractory material and the Calcium aluminate-based cement;

\*\* in relation to the basic refractory mass

TABLE 3

| basic mixtures of the products (formulation in mass %) | (α) Zirconia Silica | 5 Zirconia Alumina | 6 Zirconia Zirconia | 7 Zirconia Zircon | (β) SiC Silica | 8 SiC Alumina |
|---|---|---|---|---|---|---|
| Doped zirconia CaO-12/30 m mesh from Unitec | 27 | 27 | 26 | 27 | | |
| CaO-Doped zirconia 30/100 mesh from Unitec | 14 | 14 | 13 | 13.1 | | |
| CaO-Doped zirconia 30 mesh from Unitec | 17.97 | 17.97 | 17.97 | 17.77 | | |
| CaO-Doped zirconia 300 mesh from Unitec | 21 | 21 | 21 | 21.5 | | |
| SiC0 grains, 2-2 mm 14/30 from SG materials | | | | | 26 | 26 |
| SiC0 grains, 2-2 mm 36/70 from SG materials | | | | | 13 | 13 |
| SiC0 powder, 0.2 mm 80/180 from SG materials | | | | | 17.5 | 17.5 |
| SiC0 powder, 0-0.2 mm 220F from SG materials | | | | | 20.5 | 20.5 |
| Silica smoke 983 U supplied by Elkem | 6 | 0 | 0 | 0 | 7 | 0 |
| CaO aluminate-based cement CA270 supplied by Alcoa | 3 | 3 | 3 | 2.8 | 4 | 4 |
| Bayer-type alumina powder supplied by Almatis Median diameter D50#4.3 microns | 11 | 11 | 10 | 10.3 | 12 | 12 |
| spheroidal alumina Admatech 0502 by Admatech Median diameter D50 = 0.7 μm | 0 | 6 | | | 0 | 7 |
| Zirconia spheroidal particles ($ZrO_2$) Netsch Median diameter D50 = 1 mm | | | 9 | | | |
| Zircon spheroidal particles ($ZrSiO_4$) B505NP supplied by Saint-Gobain Zir-pro; Median diameter D50 = 20 μm | | | | 7.5 | | |
| Dispersant without phosphate: sodium methacrylate-type | 0.03 | 0.03 | 0.03 | 0.03 | 0.03 | 0.03 |
| Sum of dry materials | 100 | 100 | 100 | 100 | 100 | 100 |
| Water | 6 | 6 | 6 | 6 | 9 | 8 |

TABLE 3-continued

| basic mixtures of the products (formulation in mass %) | (α) Zirconia Silica | 5 Zirconia Alumina | 6 Zirconia Zirconia | 7 Zirconia Zircon | (β) SiC Silica | 8 SiC Alumina |
|---|---|---|---|---|---|---|
| Relative standard deviation of the sizes of added spherical or spheroidized particles (in %) | NA | 52 | 7 | 42 | NA | 52 |
| Flowability cone (mm) | 360 | 370 | 310 | 370 | 340 | 325 |
| Flowability/% added water ratio ** | 58 | 60 | 50 | 60 | 36 | 39 |
| MVA (bulk density) | 3.71 | | 4.2 | 4.12 | 2.62 | 2.62 |
| PO (open porosity) % | 17.8 | | 19.5 | 18.4 | 12.2 | 15.9 |
| Chemistry calculated in % of the composition * | | | | | | |
| % $SiO_2$ | 6 | <0.6 | <0.6 | 3 | 8.5 | <2 |
| % $Al_2O_3$ | 13 | 19 | 19 | 13 | 14.5 | 21 |
| % $ZrO_2$ | 76 | 76 | 83 | 81 | NA | NA |
| % SiC | NA | NA | NA | NA | 75 | 75 |

NA = non-applicable; NT = non-tested; NF = non-flowable = value = 100 mm;
\* containing the basic refractory material and the CaO aluminate-based cement;
\*\* in relation to the basic refractory mass Examples A and B concern compositions described in EP 0,609,868. Their comparison shows the known positive effect on the flowability of a spheroidized alumina powder compared to that of a non-spheroidized alumina powder. The flowability of examples A and B remains lower than the necessary value for a filler mortar.

Composition C differs from composition A in that the silica was replaced by the spheroidized alumina powder. One notes that this substitution caused a deterioration of the flowability. The use of any spheroidized alumina powder is therefore not enough to compensate for the loss of flowability resulting from the absence of silica smoke.

Composition C differs from composition B in that it does not contain silica. One notes that this substitution has also caused a deterioration of the flowability. Therefore, the comparison of examples A, B and C confirms the technical prejudice, according to which the absence of silica leads to a deterioration of the flowability. The compositions described in EP 0,609,868 do not therefore allow a self-flow filler mortar to be manufactured.

Example D also shows that a change in dispersant does not lead to an improvement of the flowability of composition C.

A comparison of examples 1 and 2 shows that the substitution of silica with spherical fine alumina powder having a median diameter D50 of 0.7 μm and a relative standard deviation of 52 improves the flowability. By comparing example 2 and example A, one notes the importance of the spherical aspect of the alumina powder: the use of a non-spherical alumina powder with a median diameter of 4.3 μm does not in fact allow satisfactory results to be achieved, despite the presence of silica.

A comparison of examples 2 to 4 shows that the use of spherical fine alumina powder with a median diameter of 0.7 μm or 1 mm; or spherical fine zirconia powder with a median diameter of 1 mm also allows to obtain results which are close to those obtained with an addition of silica, provided that the relative standard deviation is less than 100%. A median diameter of less than 1 μm gives the best results.

A comparison of examples 3 and 4 shows that the use of spherical fine alumina powder or spherical fine zirconia powder with a median diameter of 1 mm gives similar results.

Examples (α) and 5 to 7 show that a good flowability of a zirconia-based refractory mortar which does not contain silica, or very little, can also be obtained by the presence of spherical particles powder with median size of 0.7 μm, 20 μm or 1 mm, whether this powder is an alumina powder, a zirconia powder or a zircon powder.

A median diameter less than 1 μm, in fact less than 0.7 μm, gives the best results (370 mm cone).

The best results (370 mm cone) are also obtained with a median diameter of 20 μm and a zircon spherical particles powder. The zircon thus allows less fine powders, and therefore less costly to be used. However, zircon introduces a small amount of silica which, as explained in the introduction, damages certain properties of the sintered product obtained.

Likewise, the examples (β) and 8 show that a good flowability of a silicon carbide-based refractory mortar which does not contain silica, or very little, can also be obtained by the presence of a spherical alumina particles powder with median size of 0.7 μm.

In addition, porosity and bulk density measurements show that all the products manufactured from self-flow refractory mortars according to the invention have a porosity of less than 20%, i.e. satisfactory for a refractory application.

The following table 4 shows that the products manufactured from refractory mortars according to the invention (by baking and ceramisation) have, as it is known, a higher creep resistance to that of mortars containing silica.

TABLE 4

| Creep resistance | 1 (Alumina Silica) | 2 (Alumina Alumina) | 3 (Alumina Alumina) |
|---|---|---|---|
| MVA (bulk density) | 2.98 | 3.01 | 3.05 |
| PO (open porosity) % | 16.3 | 18 | 17.9 |
| 1500° C./0.2 MPa/air flow according to ISO 3187 standard | | | |
| Between 5 and 25 hours dimensional variation in % | −3.5 | −0.2 | −0.6 |
| Between 5 and 100 hours dimensional variation in % | −7.9 | −0.6 | −1.2 |

Of course, the described embodiments are only examples and they can be modified, notably by substitution of the technical equivalents, without leaving the context of the invention.

The invention claimed is:

1. A refractory self-flow filler mortar, comprising in mass % with relation to the basic refractory material, at least 5% and at most 10% of non-granulated spherical particles with median size greater than or equal to 0.1 µm and less than or equal to 2 mm, each of said spherical particles having a ratio between a smallest diameter and a largest diameter greater than or equal to 0.75, and said mortar further comprising in mass % with relation to the total dry mass of the mortar, less than 4.5% of silica ($SiO_2$) and between 1% and 8% of water,
the relative standard deviation of the non-granulated spherical particle sizes being less than 100%.

2. The refractory self-flow filler mortar according to claim 1, wherein the relative standard deviation of the non-granulated spherical particle size is less than 60%.

3. The refractory self-flow filler mortar according to claim 1, wherein the non-granulated spherical particles have a median size which is greater than or equal to 0.1 µm and less than or equal to 100 µm.

4. The refractory self-flow filler mortar according to claim 3, wherein the non-granulated spherical particles have a median size which is greater than or equal to 0.1 µm and less than or equal to 1 µm.

5. The refractory self-flow filler mortar according to claim 3, comprising less than 2% of silica, in mass % with relation to the dry material.

6. The refractory self-flow filler mortar according to claim 1, wherein the spherical particles have a sphericity greater than or equal to 0.8.

7. The refractory self-flow filler mortar according to claim 6, wherein the spherical particles have a sphericity greater than or equal to 0.9.

8. The refractory self-flow filler mortar according to claim 1, further comprising alumina whose content is greater than 95% in mass % with relation to the dry material.

9. The refractory self-flow filler mortar according to claim 1, comprising 1% or more and less than 5% of water in mass % compared to the dry mass.

10. The refractory self-flow filler mortar according to claim 2, wherein the non-granulated spherical particles have a median size which is greater than or equal to 0.1 µm and less than or equal to 100 µm.

11. The refractory self-flow filler mortar according to claim 2, comprising less than 2% of silica, in mass % with relation to the dry material.

12. The refractory self-flow filler mortar according to claim 3, comprising less than 2% of silica, in mass % with relation to the dry material.

13. The refractory self-flow filler mortar according to claim 1, comprising less than 2% of silica, in mass % with relation to the dry material.

14. A method of filling a hole less than 25 mm wide comprising the step of self-flow filling the hole with the refractory self-flow filler mortar according to claim 1.

* * * * *